(12) United States Patent
Ranade

(10) Patent No.: US 8,407,438 B1
(45) Date of Patent: Mar. 26, 2013

(54) SYSTEMS AND METHODS FOR MANAGING VIRTUAL STORAGE DISK DATA

(75) Inventor: Dilip Ranade, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 304 days.

(21) Appl. No.: 12/857,079

(22) Filed: Aug. 16, 2010

(51) Int. Cl.
*G06F 12/02* (2006.01)
(52) U.S. Cl. ........ 711/165; 711/161; 711/162; 711/203; 711/206
(58) Field of Classification Search .................. 711/165, 711/203, 206, 161, 162
See application file for complete search history.

(56) References Cited

U.S. PATENT DOCUMENTS

2005/0273570 A1* 12/2005 DeSouter et al. ............. 711/203
2009/0019246 A1* 1/2009 Murase ......................... 711/162

\* cited by examiner

*Primary Examiner* — Jae Yu
(74) *Attorney, Agent, or Firm* — ALG Intellectual Property, LLC

(57) ABSTRACT

A method for managing virtual disk data storage may include: 1) identifying first and second virtual storage disks on a physical storage system; 2) identifying relocatable data in the first and second virtual storage disks; 3) comparing the relocatable data from the first and second virtual storage disks to identify one or more data objects in the first virtual storage disk that are identical to one or more data objects in the second virtual storage disk; 4) physically relocating the data objects from the first virtual storage disk to create a first chunk of data without changing a logical state of data in the first virtual storage disk; and 5) physically relocating the data objects from the second virtual storage disk to create a second chunk of data that is identical to the first chunk of data without changing a logical state of data in the second virtual storage disk.

20 Claims, 6 Drawing Sheets

SYSTEMS AND METHODS FOR MANAGING VIRTUAL STORAGE DISK DATA

BACKGROUND

Virtual machines may store their data in virtual devices referred to as virtual storage disks. Virtual storage disks may be implemented as files in the host file system of a virtual machine server. A guest operating system operating within a virtual machine may treat a virtual storage disk as a block storage device, typically creating and using a file system within the virtual storage disk.

Virtual machines are often based on a master virtual machine image (e.g., a golden image) that acts as a template for creating additional virtual machines. In other words, a master virtual machine may be used to create similar or identical virtual machines that include instances of an OS and other applications from the master virtual machine image. A server may include thousands of virtual machines that are derived from a common master virtual machine image. Accordingly, the virtual machines on the server may include significant amounts of duplicate data, and deduplicating data on the server may provide significant storage space savings.

As the virtual machines on the server run, they may write data in the virtual storage disks, and data on the virtual storage disks may begin to diverge. Over time, deduplication on the server may be less and less effective, even when virtual storage disks still have many identical blocks of data if those blocks of data are not arranged in the same sequence within a deduplication-sized chunk of data. Furthermore, deduplication is often performed on relatively large data chunks (deduplication may be more efficient when performed on large chunks), which may result in a significant amount of duplicate data that is not deduplicated. What is needed, therefore, is a more efficient mechanism for handling deduplication in the context of multiple virtual storage disks.

SUMMARY

As will be described in greater detail below, the instant disclosure generally relates to systems and methods for managing virtual storage disk data. In some embodiments, methods described herein may rearrange data on two or more virtual storage disks to create identical data chunks for deduplication. For example, a computer-implemented method for managing virtual storage disk data may include: 1) identifying first and second virtual storage disks on a physical storage system; 2) identifying relocatable data in the first virtual storage disk that is capable of being physically relocated on the physical storage system; 3) identifying relocatable data in the second virtual storage disk that is capable of being physically relocated on the physical storage system; 4) comparing the relocatable data from the first and second virtual storage disks to identify one or more data objects (e.g., data blocks, file system metadata, etc.) in the first virtual storage disk that are identical to one or more data objects in the second virtual storage disk; 5) physically relocating one or more of the data objects from the first virtual storage disk to create a first chunk of data without changing a logical state of data in the first virtual storage disk; and 6) physically relocating one or more of the data objects from the second virtual storage disk to create a second chunk of data that is identical to the first chunk of data without changing a logical state of data in the second virtual storage disk. The method may also include deduplicating the first and second chunks of data.

In some embodiments, the first virtual storage disk may include data of a first virtual machine, the second virtual storage disk may include data of a second virtual machine, and the first and second virtual machines may be derived from a master virtual machine. Additionally or alternatively, the identical data objects from the first and second virtual storage disks may include data blocks of one or more files of the first and second virtual storage disks. In such embodiments, physically relocating the identical data objects from the first and second virtual storage disks may include updating file system pointers to refer to new locations of the identical data objects.

According to various embodiments, the identical data objects from the first and second virtual storage disks may include file system metadata. In certain embodiments, identifying relocatable data in the first virtual storage disk may include identifying unused data blocks in the first virtual storage disk and normalizing the unused data blocks in the first virtual storage disk. Similarly, identifying relocatable data in the second virtual storage disk may include identifying unused data blocks in the second virtual storage disk and normalizing the unused data blocks in the second virtual storage disk. In such embodiments, physically relocating the identical data objects from the first and second virtual storage disks may include updating free block lists of the first and second virtual storage disks.

In at least one embodiment, a system may include an identification module programmed to identify first and second virtual storage disks on a physical storage system, identify relocatable data in the first virtual storage disk that is capable of being physically relocated on the physical storage system, and identify relocatable data in the second virtual storage disk that is capable of being physically relocated on the physical storage system. The system may also include a comparison module programmed to compare the relocatable data from the first and second virtual storage disks to identify one or more data objects in the first virtual storage disk that are identical to one or more data objects in the second virtual storage disk. The system may further include a relocation module programmed to physically relocate one or more of the data objects from the first virtual storage disk to create a first chunk of data without changing a logical state of data in the first virtual storage disk. The relocation module may also be programmed to physically relocate one or more of the data objects from the second virtual storage disk to create a second chunk of data that is identical to the first chunk of data without changing a logical state of data in the second virtual storage disk.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
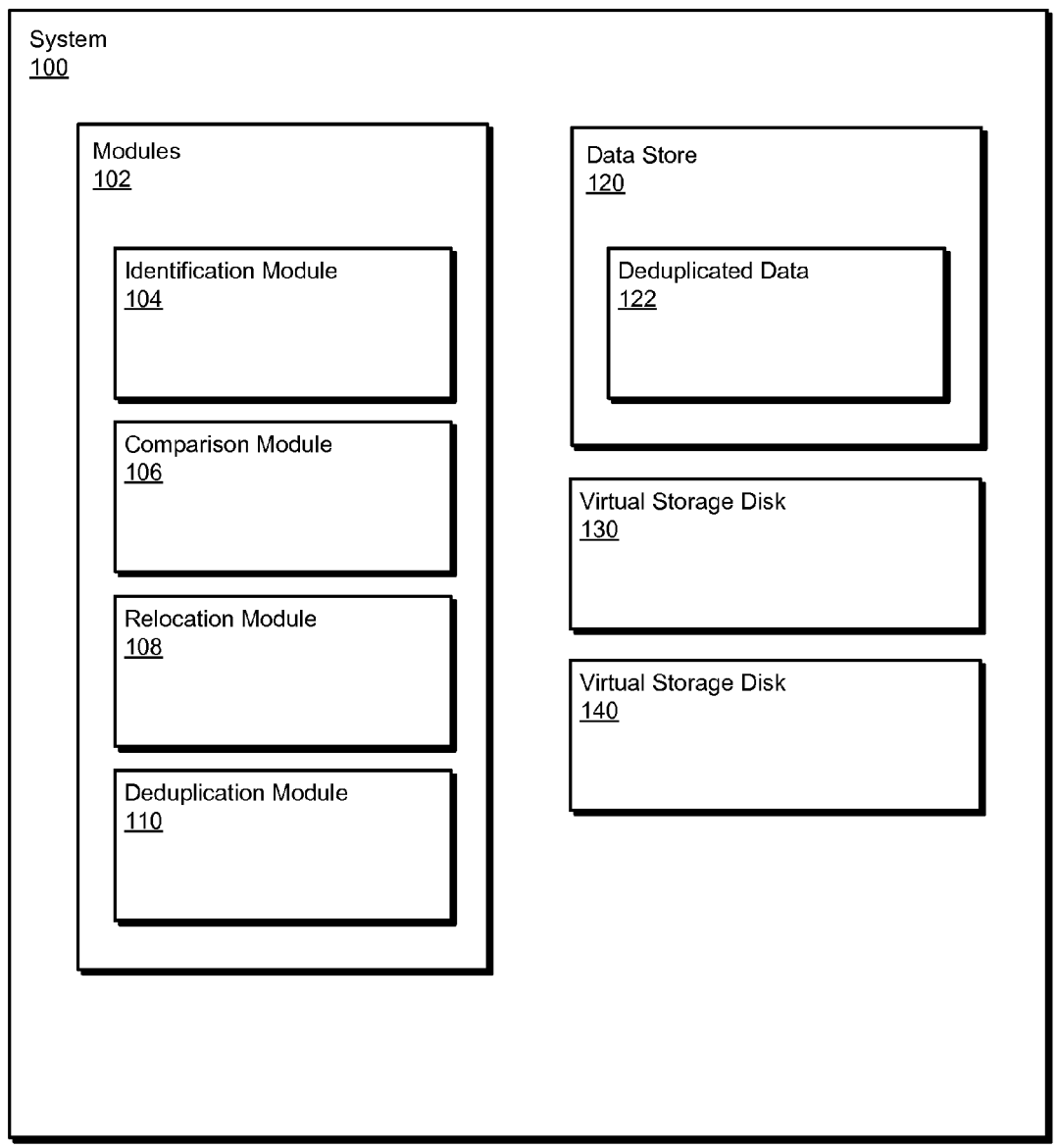
FIG. 1 is a block diagram of an exemplary system for managing virtual storage disk data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing virtual storage disk data. For example, a system for managing virtual storage disk data may identify first and second virtual storage disks on a server. The system may then identify data in the first virtual storage disk that can be relocated. This relocatable data may include file contents of files, file system metadata (e.g., directory contents), and/or any other suitable type of data. The system may also identify data in the second virtual storage disk that can be relocated. In some embodiments, the system may also identify unused free blocks in the first and second virtual storage disks and may normalize the contents of these free blocks.

The system may then identify data (e.g., data blocks, metadata, etc.) in the first virtual storage disk that is identical to data in the second virtual storage disk, and may rearrange data in the first and second virtual storage disks to create one or more chunk-sized data regions in the first virtual storage disk that are identical to one or more chunk-sized data regions in the second virtual storage disk. These chunk-sized data regions may then be deduplicated. In this manner, embodiments of the instant disclosure may improve deduplication on a system having two or more virtual machines. Embodiments of the instant disclosure may also provide various other features and advantages.

Figure 2:
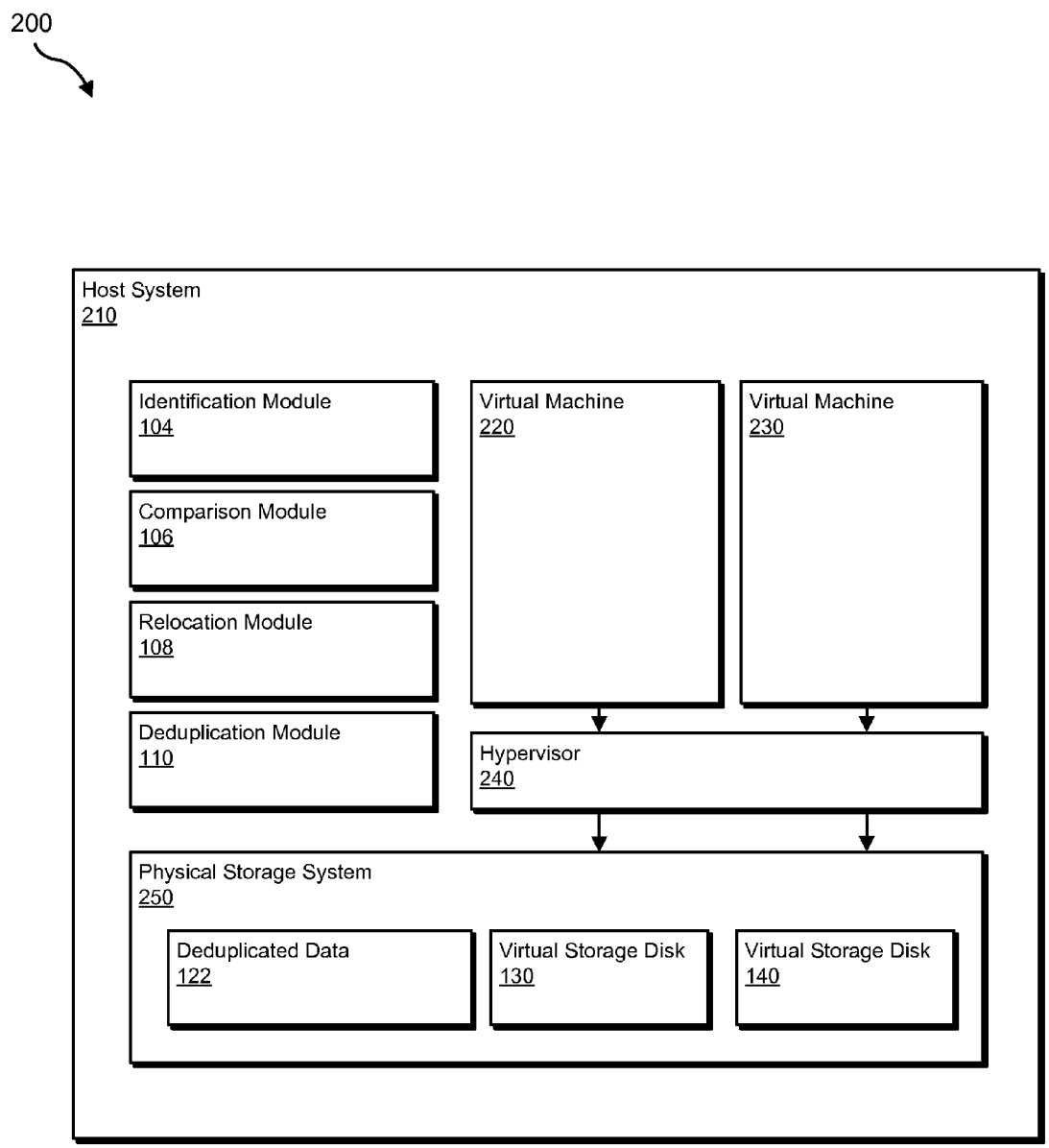
FIG. 2 is a block diagram of another exemplary system for managing virtual storage disk data.

The following will provide, with reference to FIGS. 1-2, detailed descriptions of exemplary systems for managing virtual storage disk data. Detailed descriptions of corresponding computer-implemented methods will also be provided in connection with FIG. 3. Detailed descriptions of examples of data block relocation in virtual storage disks are provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing virtual storage disk data. As illustrated in this figure, exemplary system 100 may include one or more modules 102 for performing one or more tasks. For example, and as will be explained in greater detail below, exemplary system 100 may include an identification module 104 programmed to identify first and second virtual storage disks on a physical storage system, identify relocatable data in the first virtual storage disk that is capable of being physically relocated on the physical storage system, and identify relocatable data in the second virtual storage disk that is capable of being physically relocated on the physical storage system.

Exemplary system 100 may also include a comparison module 106 programmed to compare the relocatable data from the first and second virtual storage disks to identify one or more data objects in the first virtual storage disk that are identical to one or more data objects in the second virtual storage disk. Exemplary system 100 may further include a relocation module 108 programmed to physically relocate one or more of the data objects from the first virtual storage disk to create a first chunk of data without changing a logical state of data in the first virtual storage disk. Relocation module 108 may also be programmed to physically relocate one or more of the data objects from the second virtual storage disk to create a second chunk of data that is identical to the first chunk of data without changing a logical state of data in the second virtual storage disk. In addition, and as will be described in greater detail below, exemplary system 100 may include a deduplication module 110 programmed to deduplicate the first and second chunks of data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as host system 210 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a data store 120, which may include deduplicated data 122. Data store 120 may be any type of data store capable of storing deduplicated data. For example, data store 120 may be a single-instance data storage system configured to store only non-redundant instances of data.

Data store 120 may represent portions of a single database or computing device or a plurality of databases or computing devices. Data store 120 in FIG. 1 may represent a portion of one or more computing devices. For example, data store 120 may represent a portion of host system 210 in FIG. 2, computing system 510 in FIG. 5, and/or portions of exemplary network architecture 600 in FIG. 6. Alternatively, data store 120 in FIG. 1 may represent one or more physically separate devices capable of being accessed by a computing device, such as host system 210 in FIG. 2, computing system 510 in FIG. 5, and/or portions of exemplary network architecture 600 in FIG. 6.

System 100 may also include virtual storage disks 130 and 140. As used herein, the phrase "virtual storage disk" generally refers to any type of storage entity that stores data of a virtual machine. Virtual storage disks may also be referred to as virtual hard disks.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In at least one embodiment, exemplary system 100 may be deployed on a host system, as shown in FIG. 2 which shows a host system 210, a virtual machine 220, and a virtual machine 230. Host system 210 generally represents any type or form of computing device capable of reading computer-executable instructions. Examples of host system 210 include, without limitation, laptops, desktops, servers, cellular phones, personal digital assistants (PDAs), multimedia players, embedded systems, combinations of one or more of the same, exemplary computing system 510 in FIG. 5, or any other suitable computing device. Additionally or alternatively, host system 210 may include a server environment. For example, host system 210 may include without limitation, application servers and database servers configured to provide various database services and/or run certain software applications.

Virtual machines 220 and 230 generally represent any type or form of virtual machine. As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

In some embodiments, virtual machines 220 and 230 may be derived from a common master virtual machine. The phrase "master virtual machine," as used herein, generally refers to any virtual machine and/or virtual machine image used as a template or base to create one or more additional virtual machines. In some embodiments described herein, the phrase "master virtual machine" may refer to a virtual machine that runs on a host machine when the host machine executes a master virtual machine image (also referred to as a golden image) that is used as a template or base to create one or more additional virtual machine images.

Host system 210 may include a hypervisor 240 that enables one or more virtual machines to run on host system 210. Hypervisor 240 may include any suitable virtualization software, such as VMWARE, Oracle VM, ESX server, XEN, HYPER-V, LYNXSECURE, TRANGO, IBM POWER, KVM, and/or any other suitable virtualization application. Hypervisor 240 may provide virtual machines 220 and 230 with access to virtual storage disks 130 and 140, respectively. Virtual storage disk 130 generally represents a virtual block device accessed by an operating system of virtual machine 220, and virtual storage disk 140 generally represents a virtual block device accessed by an operating system of virtual machine 230. Virtual storage disks 130 and 140 may be implemented as files on host system 210.

As shown in FIG. 2, host system 210 may include identification module 104, comparison module 106, relocation module 108, and deduplication module 110. In some embodiments, these modules may execute within a host operating system environment of host system 210. Additionally or alternatively, one or more of identification module 104, comparison module 106, relocation module 108 and/or deduplication module 110 may execute within virtual machine 220, virtual machine 230, and/or a remote system.

Figure 3:
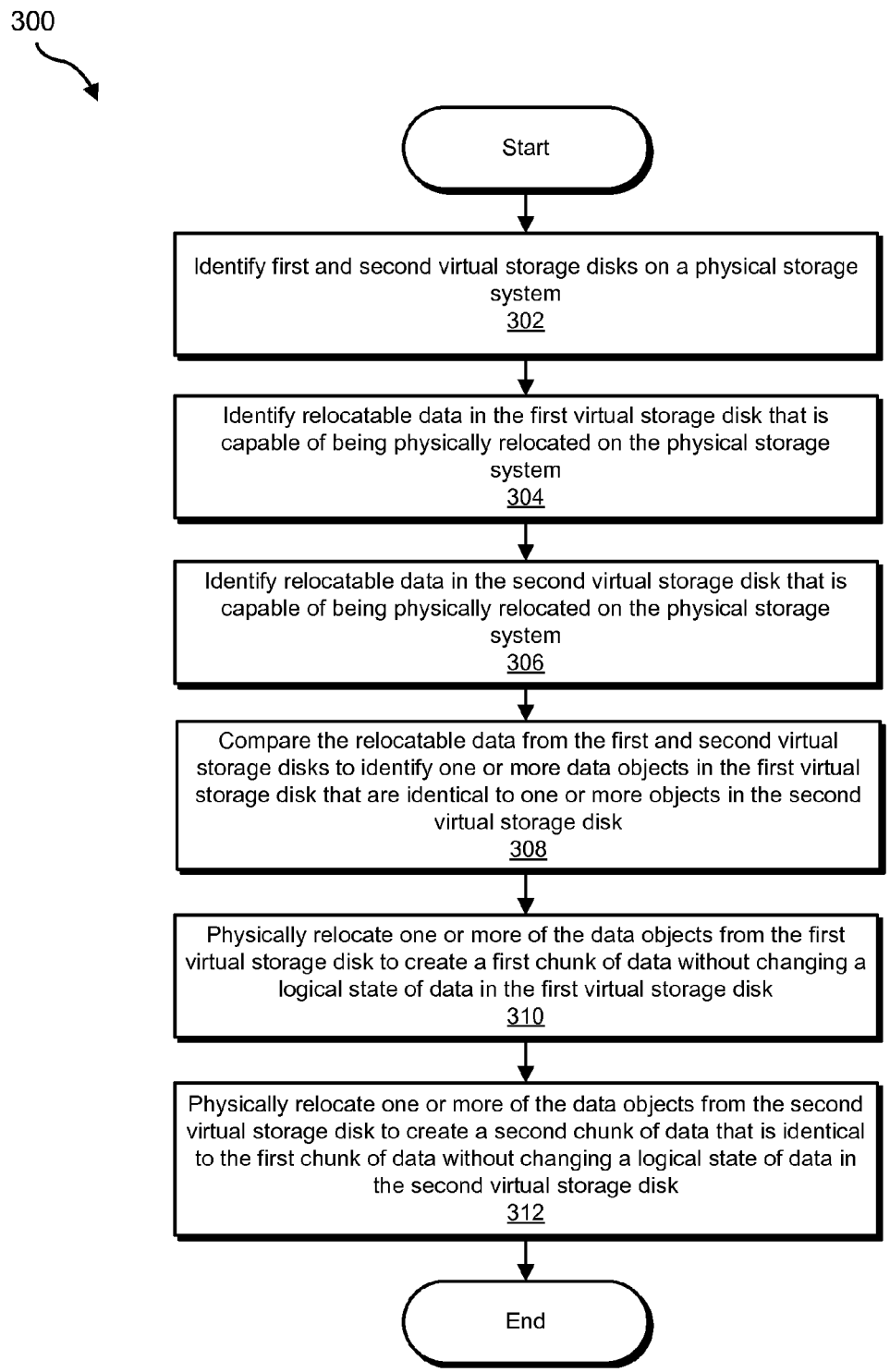
FIG. 3 is a flow diagram of an exemplary method for managing virtual storage disk data.

FIG. 3 is a flow diagram of an exemplary computer-implemented method 300 for managing virtual storage disk data. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may identify first and second virtual storage disks on a physical storage system. For example, identification module 104 in FIG. 1 (which may, as detailed above, represent a portion of host system 210 in FIG. 2), may identify virtual storage disk 130 and virtual storage disk 140 on physical storage system 250.

Identification module 104 may identify virtual storage disks 130 and 140 in a variety of contexts and/or manners. For example, identification module 104 may identify virtual storage disks 130 and 140 as a part of a process being performed in response to a request to deduplicate data on physical storage system 250. Identification module 104 may also identify virtual storage disks 130 and 140 in response to any other suitable request and/or trigger.

In some embodiments, identification module 104 may identify virtual storage disks 130 and 140 by searching physical storage system 250 for each virtual storage disk stored on physical storage system 250. Additionally or alternatively, identification module 104 may identify virtual storage disks 130 and 140 by identifying virtual machines 220 and 230 and then identifying virtual storage devices corresponding to virtual machines 220 and 230. Identification module 104 may also identify virtual storage disks 130 and 140 in any other suitable manner.

At step 304 in FIG. 3, one or more of the systems described herein may identify relocatable data in the first virtual storage disk that is capable of being physically relocated on the physical storage system. For example, identification module 104 may identify relocatable data in virtual storage disk 130 that is capable of being physically relocated on physical storage system 250.

Identification module 104 may identify relocatable data in virtual storage disk 130 in a variety of ways. For example, identification module 104 may identify all data within virtual storage disk 130 that is not immovable. Immovable files may include various types of system files (e.g., swap files) that cannot be physically relocated. Additionally or alternatively, identification module 104 may identify relocatable data in virtual storage disk 130 by identifying data in virtual storage disk 130 that could be moved during a disk defragmentation operation.

Figure 4:
FIG. 4 is a block diagram showing an exemplary rearrangement of data blocks in virtual storage devices.
Figure 4:

FIG. 4 shows an example of how data blocks in virtual storage disks 130 and 140 may be identified and relocated. Virtual storage disk 130(A) shows original physical placement of data stored in block locations 1-11, and virtual storage disk 130(B) shows relocated placement of data stored in block locations 1-11. Similarly, virtual storage disk 140(A) shows original physical placement of data stored in block locations 1-11, and virtual storage disk 140(B) shows relocated placement of data stored in block locations 1-11. As an example of how step 304 may be implemented, identification module 104 may identify blocks 1, 2, 3, 6, 9, and 11 of virtual storage disk 130 as being relocatable. Identification module 104 may also identify blocks 4, 7, and 8 as being free and therefore relocatable.

At step 306 in FIG. 3, one or more of the systems described herein may identify relocatable data in the second virtual storage disk that is capable of being physically relocated on the physical storage system. For example, identification module 104 may identify relocatable data in virtual storage disk 140 that is capable of being physically relocated on physical storage system 250. Identification module 104 may identify relocatable data on virtual storage disk 140 in any of the ways discussed previously in connection with step 304. Turning to the example in FIG. 4, identification module 104 may identify storage blocks 2, 5, 6, 7, and 10 as being data blocks that can be relocated on virtual storage disk 140. Identification module 104 may also identify blocks 1, 3, and 6 as being free and therefore relocatable.

At step 308 in FIG. 3, one or more of the systems described herein may compare the relocatable data from the first and second virtual storage disks to identify one or more data objects (e.g., data blocks of files, file system metadata, free blocks, etc.) in the first virtual storage disk that are identical to one or more data objects in the second virtual storage disk. For example, comparison module 106 may compare the relocatable data from virtual storage disks 130 and 140 to identify data objects in virtual storage disk 130 that are identical to data objects in virtual storage disk 140. Comparison module 106 may perform the comparison of data objects using any suitable data comparison and/or analysis mechanism. For example, comparison module 106 may compare blocks of data from virtual storage disk 130 to virtual storage disk 140 to determine whether they are identical. Additionally or alternatively, comparison module 106 may compare file system metadata from virtual storage disk 130 with file system metadata from virtual storage disk 140 to identify identical file system metadata in virtual storage disks 130 and 140. For example, comparison module 106 may compare directory entries from a file system of virtual machine 220 with directory entries from a file system of virtual machine 230 to identify identical directory entries.

As previously mentioned, identification module 104 may identify unused data blocks in virtual storage disk 130 and unused data blocks in virtual storage disk 140. Comparison module 106 may normalize these unused data blocks in virtual storage disks 130 and 140 to the same normalization values (e.g., all zeroes) such that any unused data blocks in virtual storage disk 130 are identical to any unused data blocks in virtual storage disk 140.

At step 310 in FIG. 3, one or more of the systems described herein may physically relocate one or more of the data objects from the first virtual storage disk to create a first chunk of data without changing a logical state of data in the first virtual storage disk. For example, relocation module 108 may physically relocate data from virtual storage disk 130 to create a chunk of data without changing a logical state of data in virtual storage disk 130. Similarly, at step 312 in FIG. 3, one or the systems described herein may physically relocate one or more of the data objects on the second virtual storage disk to create a second chunk of data that is identical to the first chunk of data without changing a logical state of data in the second virtual storage disk. For example, relocation module 108 may physically relocate one or more of the data objects from virtual storage disk 140 to create a second chunk of data that is identical to the chunk of data created in virtual storage disk 130.

As used herein, the phrase "relocating data objects without changing a logical state of data in a virtual storage disk" generally refers to maintaining the same view of a physical data object to a file system (or other file access mechanism) even when the physical location of the data object changes. Data objects of a virtual storage disk may be relocated without changing a logical state of some or all of the data on a virtual storage disk.

Data in virtual storage disks 130 and 140 may be physically relocated without changing a logical state of the data in a variety of ways. For example, physically relocating the identical data objects from the first and second storage disks may include physically moving data objects on physical storage system 250 and updating file system pointers to refer to the new locations of the relocated data objects. In some embodiments, updating file system pointers may include adjusting pointers in file inodes to point the new locations of the data objects. Updating file system pointers may additionally or alternatively include adjusting pointers in a file allocation table (e.g., for a FAT file system).

In some embodiments, physically relocating the identical data objects from the first and second virtual storage disks may include moving free data blocks and updating free block lists for the first and second virtual storage disks. Additionally or alternatively, physically relocating the identical data objects from the first and second virtual storage disks may include physically rearranging directory entries for directories of file systems of virtual machines 220 and 230. In some embodiments, data objects may be physically relocated while retaining their logical state using one or more of any suitable disk defragmentation mechanisms.

As noted, data objects from virtual storage disks 130 and 140 may be physically relocated to create data chunks. As used herein, the term "data chunk" generally refers to any contiguous region of two or more data objects. For example, a data chunk may include 100 contiguous blocks of data. In some embodiments, data objects may be physically relocated to create a chunk of data by being relocated to align with deduplication chunk boundaries.

Turning to the example illustrated in FIG. 4, relocation module 108 may relocate various data blocks in virtual storage disks 130 and 140 to create identical data chunks in virtual storage disks 130 and 140. In this example, the size of a deduplication data chunk may be three data blocks, and therefore relocation module 108 may attempt to relocate data in virtual storage disks 130 and 140 to create identical three-block data chunks in each of virtual storage disks 130 and 140.

As shown in FIG. 4, relocation module 108 may move data in block locations 2, 3, 4, 6, 9, and 11 of virtual storage disk 130(A), resulting in the arrangement shown in virtual storage disk 130(B). Relocation module 108 may move data in blocks locations 2, 5, 6, 7, and 10 of virtual storage disk 140(A), resulting in the arrangement shown in virtual storage disk 140(B). As a result, virtual storage disk 130(B) may include a three block chunk at locations 1-3 (data blocks A, E, and H) that is identical to a three block chunk at locations 4-6 of virtual storage disk 140(B). Virtual storage disk 130(B) may also include a three-block chunk of free data at block locations 7-9 that is identical to a three-block chunk of free data at block locations 1-3 in virtual storage disk 140(B).

After the data is relocated, deduplication module 110 may deduplicate data on physical storage system 250. For example, the data chunks containing the contents A, E, and H in virtual storage disks 130(B) and 140(B) may be deduplicated. Similarly, the data chunks of free blocks in virtual storage disks 130(B) and 140(B) may be deduplicated.

As used herein, the term "deduplication" may refer to one or more operations related to reducing the amount of storage space used in a data storage system, including operations for detecting and preventing data from being redundantly stored to the same storage system. For example, data deduplication may reduce the amount of storage space used in a data storage system by detecting and removing redundant copies of data in the data storage system. In embodiments of the instant disclosure, data deduplication may be implemented using any suitable deduplication algorithm or technology.

While the examples discussed in connection with FIGS. 3 and 4 discuss data relocation and deduplication in the context of two virtual machines, embodiments of the instant disclosure may be implemented on any number of virtual machines. By coordinating data relocation among two or more virtual machines, embodiments of the instant disclosure may prepare virtual machines for more efficient data deduplication. In situations where multiple virtual machines are derived from a common master virtual machine, deduplication on the derived virtual machines may continue to be efficient even as the contents of the derived virtual machines diverge over time. Embodiments of the instant disclosure may also enable relatively efficient deduplication in situations where deduplication is implemented on relatively large data chunks.

Figure 5:
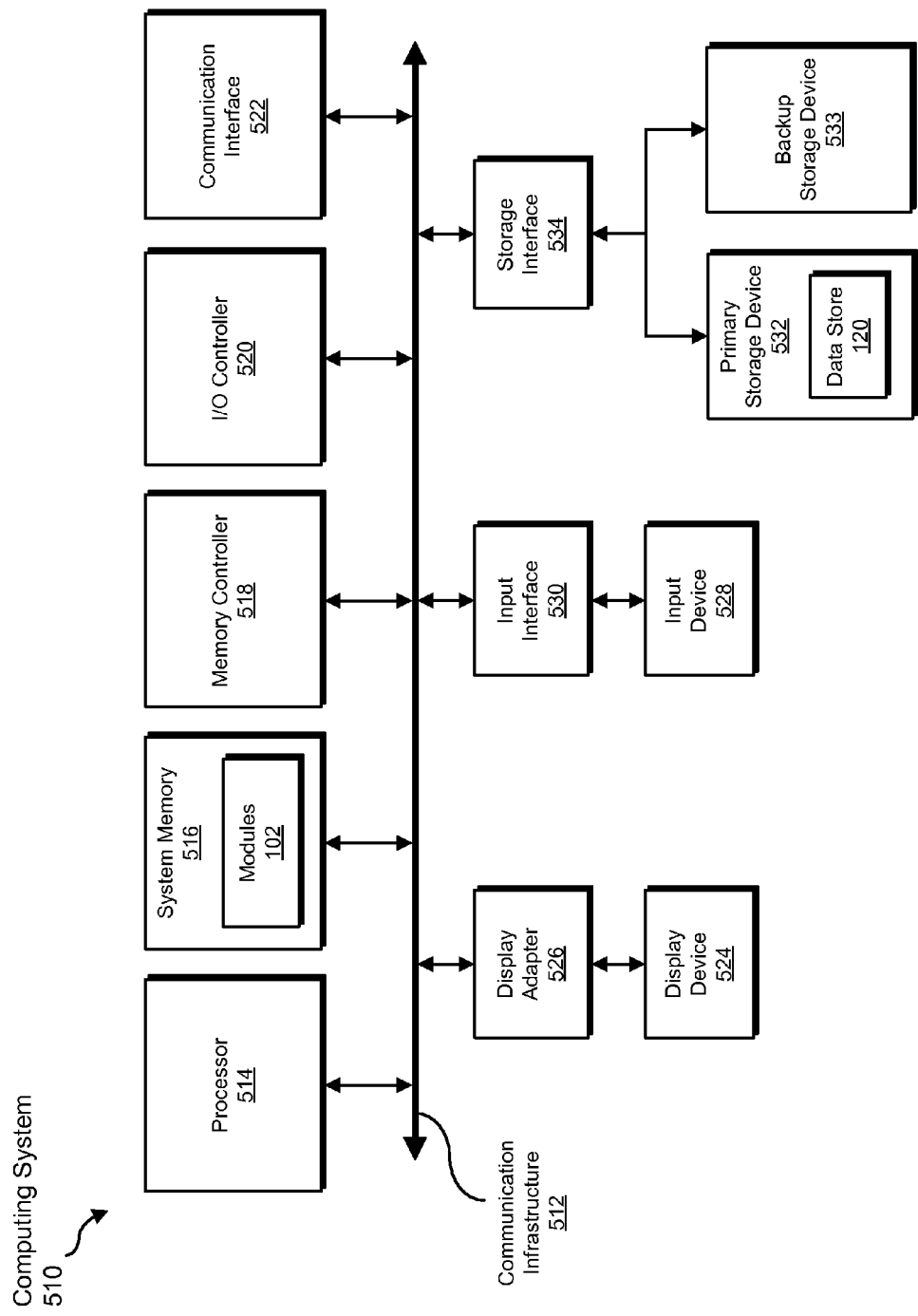
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, comparing, relocating, deduplicating, updating and normalizing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, comparing, relocating, deduplicating, updating and normalizing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, comparing, relocating, deduplicating, updating and normalizing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, comparing, relocating, deduplicating, updating and normalizing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, comparing, relocating, deduplicating, updating and normalizing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data store 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, comparing, relocating, deduplicating, updating and normalizing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
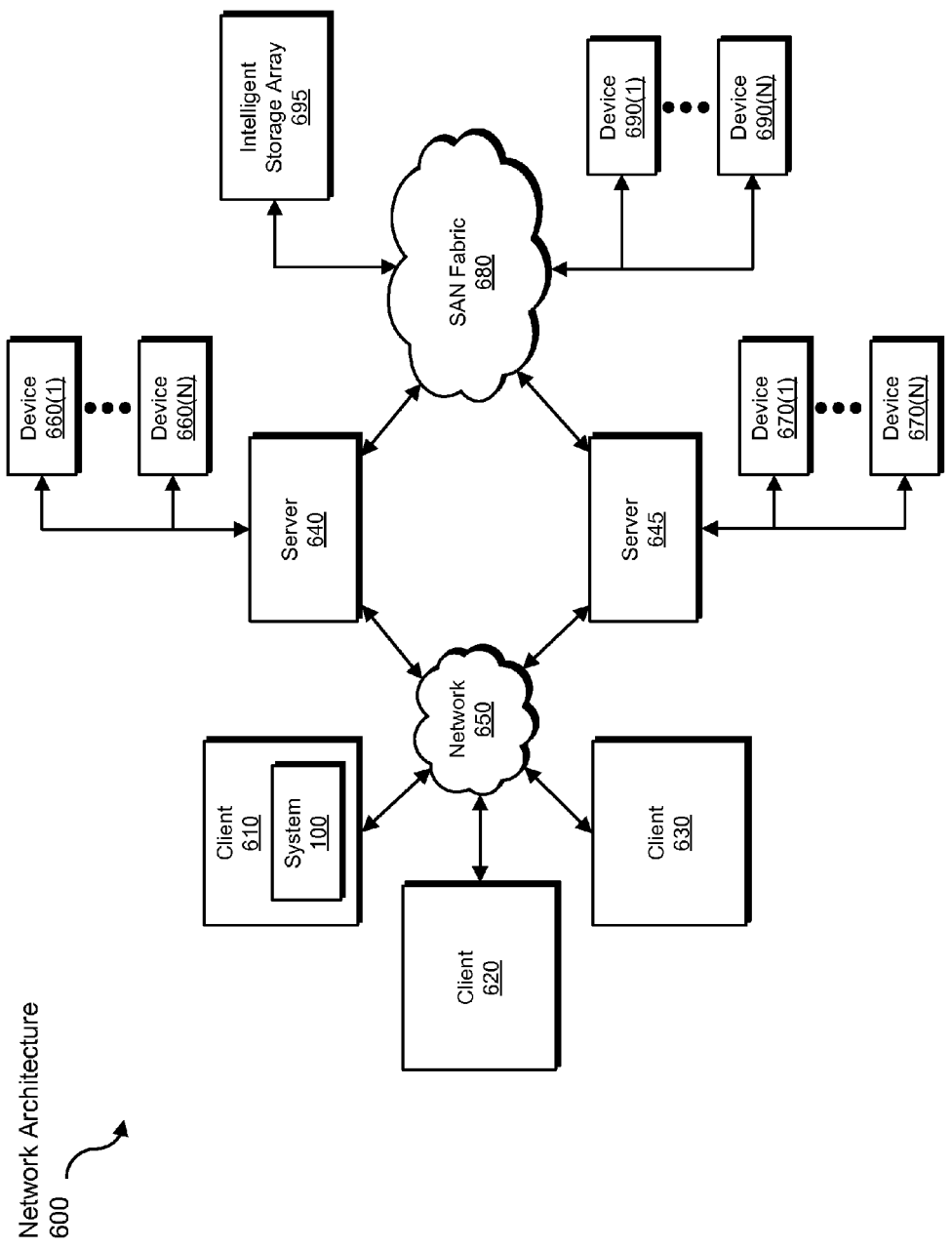
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, comparing, relocating, deduplicating, updating and normalizing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for managing virtual storage disk data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a physical storage system by physically relocating data on the physical storage system to enable more efficient data deduplication.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing virtual storage disk data, at least a portion of the method being performed by a computing device comprising at least one processor, the method comprising:
    identifying first and second virtual storage disks on a physical storage system;
    identifying relocatable data in the first virtual storage disk that is capable of being physically relocated on the physical storage system;
    identifying relocatable data in the second virtual storage disk that is capable of being physically relocated on the physical storage system;
    comparing the relocatable data from the first and second virtual storage disks to identify one or more data objects in the first virtual storage disk that are identical to one or more data objects in the second virtual storage disk;
    physically relocating one or more of the data objects from the first virtual storage disk to create a first chunk of data without changing a logical state of data in the first virtual storage disk;
    physically relocating one or more of the data objects from the second virtual storage disk to create a second chunk of data that is identical to the first chunk of data without changing a logical state of data in the second virtual storage disk, wherein physically relocating the identical data objects from the first and second virtual storage disks comprises at least one of:
        updating file system pointers to refer to new locations of the identical data objects, and/or
        updating free block lists of the first and second virtual storage disks.

2. The method of claim 1, wherein:
    the first virtual storage disk comprises data of a first virtual machine;

the second virtual storage disk comprises data of a second virtual machine;
the first and second virtual machines are derived from a master virtual machine.

3. The method of claim 1, further comprising:
deduplicating the first and second chunks of data.

4. The method of claim 1, wherein:
the identical data objects from the first and second virtual storage disks comprise data blocks of one or more files of the first and second virtual storage disks.

5. The method of claim 1, wherein creating the first chunk of data comprises:
physically relocating the one or more data objects from the first virtual storage disk to create a contiguous region of two or more data objects that is aligned with deduplication chunk boundaries.

6. The method of claim 1, wherein:
the identical data objects from the first and second virtual storage disks comprise file system metadata.

7. The method of claim 1, wherein:
identifying relocatable data in the first virtual storage disk comprises:
identifying unused data blocks in the first virtual storage disk;
normalizing the unused data blocks in the first virtual storage disk;
identifying relocatable data in the second virtual storage disk comprises:
identifying unused data blocks in the second virtual storage disk;
normalizing the unused data blocks in the second virtual storage disk.

8. The method of claim 7, wherein physically relocating the identical data objects from the first and second virtual storage disks is performed using a disk defragmentation mechanism.

9. A system for managing virtual storage disk data, the system comprising:
an identification module programmed to:
identify first and second virtual storage disks on a physical storage system;
identify relocatable data in the first virtual storage disk that is capable of being physically relocated on the physical storage system;
identify relocatable data in the second virtual storage disk that is capable of being physically relocated on the physical storage system;
a comparison module programmed to:
compare the relocatable data from the first and second virtual storage disks to identify one or more data objects in the first virtual storage disk that are identical to one or more data objects in the second virtual storage disk;
a relocation module programmed to:
physically relocate one or more of the data objects from the first virtual storage disk to create a first chunk of data without changing a logical state of data in the first virtual storage disk;
physically relocate one or more of the data objects from the second virtual storage disk to create a second chunk of data that is identical to the first chunk of data without changing a logical state of data in the second virtual storage disk, wherein the relocation module is programmed to physically relocate the identical data objects from the first and second virtual storage disks by performing at least one of:
updating file system pointers to refer to new locations of the identical data objects, and/or
updating free block lists of the first and second virtual storage disks;
one or more processors configured to execute the identification module, the comparison module, and the relocation module.

10. The system of claim 9, wherein:
the first virtual storage disk comprises data of a first virtual machine;
the second virtual storage disk comprises data of a second virtual machine;
the first and second virtual machines are derived from a master virtual machine.

11. The system of claim 9, further comprising:
a deduplication module programmed to deduplicate the first and second chunks of data.

12. The system of claim 9, wherein:
the identical data objects from the first and second virtual storage disks comprise data blocks of one or more files of the first and second virtual storage disks.

13. The system of claim 9, wherein:
the relocation module is programmed to create the first chunk of data by physically relocating the one or more data objects from the first virtual storage disk to create a contiguous region of two or more data objects that is aligned with deduplication chunk boundaries.

14. The system of claim 9, wherein:
the identical data objects from the first and second virtual storage disks comprise file system metadata.

15. The system of claim 9, wherein:
the identification module is programmed to identify relocatable data in the first virtual storage disk by:
identifying unused data blocks in the first virtual storage disk;
normalizing the unused data blocks in the first virtual storage disk;
the identification module is programmed to identify relocatable data in the second virtual storage disk by:
identifying unused data blocks in the second virtual storage disk;
normalizing the unused data blocks in the second virtual storage disk.

16. The system of claim 15, wherein:
the relocation module is programmed to physically relocate the identical data objects from the first and second virtual storage disks by using a disk defragmentation mechanism.

17. A computer-readable-storage medium comprising one or more computer-executable instructions that, when executed by at least one processor of a computing device, cause the computing device to:
identify first and second virtual storage disks on a physical storage system;
identify relocatable data in the first virtual storage disk that is capable of being physically relocated on the physical storage system;
identify relocatable data in the second virtual storage disk that is capable of being physically relocated on the physical storage system;
compare the relocatable data from the first and second virtual storage disks to identify one or more data objects in the first virtual storage disk that are identical to one or more data objects in the second virtual storage disk;
physically relocate one or more of the data objects from the first virtual storage disk to create a first chunk of data without changing a logical state of data in the first virtual storage disk;

physically relocate one or more of the data objects from the second virtual storage disk to create a second chunk of data that is identical to the first chunk of data without changing a logical state of data in the second virtual storage disk, wherein physically relocating the identical data objects from the first and second virtual storage disks comprises at least one of:

updating file system pointers to refer to new locations of the identical data objects, and/or updating free block lists of the first and second virtual storage disks.

18. The computer-readable-storage medium of claim 17, wherein:

the first virtual storage disk comprises data of a first virtual machine;

the second virtual storage disk comprises data of a second virtual machine;

the first and second virtual machines are derived from a master virtual machine.

19. The computer-readable-storage medium of claim 17, wherein:

the identical data objects from the first and second virtual storage disks comprise data blocks of one or more files of the first and second virtual storage disks.

20. The computer-readable-storage medium of claim 17, wherein:

the identical data objects from the first and second virtual storage disks comprise file system metadata.

* * * * *